United States Patent
Swanson et al.

(10) Patent No.: US 7,826,401 B2
(45) Date of Patent: **\*Nov. 2, 2010**

(54) METHODS AND PROGRAM PRODUCTS FOR MAPPING A NETWORK ADDRESS TRANSLATOR

(75) Inventors: Jon N. Swanson, Queensbury, NY (US); Adam M. Chapweske, Chicago, IL (US)

(73) Assignee: Insors Integrated Communications, Chicago, IL (US)

( * ) Notice: Subject to any disclaimer, the term of this patent is extended or adjusted under 35 U.S.C. 154(b) by 1143 days.

This patent is subject to a terminal disclaimer.

(21) Appl. No.: 11/135,011

(22) Filed: May 23, 2005

(65) Prior Publication Data

US 2005/0281260 A1 Dec. 22, 2005

Related U.S. Application Data

(60) Provisional application No. 60/581,472, filed on Jun. 21, 2004.

(51) Int. Cl.
*H04L 12/16* (2006.01)
*H04Q 11/00* (2006.01)

(52) U.S. Cl. .................. 370/261; 370/270; 370/271

(58) Field of Classification Search .......... 370/260–271
See application file for complete search history.

(56) References Cited

U.S. PATENT DOCUMENTS

| | | | |
|---|---|---|---|
| 5,999,979 A * | 12/1999 | Vellanki et al. | 709/232 |
| 6,360,265 B1 * | 3/2002 | Falck et al. | 709/227 |
| 6,993,595 B1 * | 1/2006 | Luptowski et al. | 709/245 |
| 7,043,564 B1 * | 5/2006 | Cook et al. | 709/246 |
| 7,333,500 B2 | 2/2008 | Roshko | |
| 7,349,948 B2 * | 3/2008 | Bussani et al. | 709/217 |
| 7,362,760 B2 * | 4/2008 | Wang | 370/392 |
| 2001/0032270 A1 * | 10/2001 | Koo | 709/237 |
| 2003/0188001 A1 | 10/2003 | Eisenberg et al. | 709/229 |
| 2005/0283536 A1 | 12/2005 | Swanson et al. | 709/232 |

OTHER PUBLICATIONS

How to make RTCP traverse NAT and interact with firewalls. Westerlund et al. Feb. 21, 2003.*

Getting SIP through Firewalls and NATs., Rosenburg et al. Feb. 22, 2000.*

(Continued)

*Primary Examiner*—Daniel J Ryman
*Assistant Examiner*—Nishant B Divecha
(74) *Attorney, Agent, or Firm*—Greer, Burns & Crain, Ltd.

(57) ABSTRACT

An exemplary method for mapping a network address translator on a packet based network that is between a client and a server comprises the steps of the client communicating a first message including a first client address to the server, the server extracting the first client address, and the server communicating a confirmation to the client including identifying data useful to identify the client to the server. Additional steps comprise the client communicating a mapper message to the server including the identifying data, the mapper message having external client address data when the server receives it, and the server extracting said identifying data and using it to identify the client. An additional step of comparing the external client address data to the first client address and using said comparison to map the one or more security devices is provided.

18 Claims, 5 Drawing Sheets

OTHER PUBLICATIONS

NAT Traversal connects, Mandy Andress, Feb. 2002, http://www.infoworld.com/articles/ne/xml/02/02/18/020218nenat.html.*

H. Schulzrinne, et al. "Real Time Streaming Protocol," Network Working Group Request for Comments 2326.

P. Srisuresh, et al. "Middlebox Communication Architecture and Framework," Network Working Group Request for Comments 3303.

P. Srisuresh and M. Holdrege. "IP Network Address Translator (NAT) Terminology and Considerations," Network Working Group Request for Comments 2663.

R. Fielding, et al. "Hypertext Transfer Protocol—HTTP/1.1," Network Working Group Request for Comments 2616.

J. Franks, et all. "An Extension to HTTP: Digest Access Authentication," Network Working Group Request Comments 2069.

"Static NAT Mapping", Eicon Networks, http://www.eicon.com/support/helpweb/safepipe/static_nat.html, 2004.

Baruch Sterman, Ph.D., David Schwartz, "NAT Traversal in SIP", Deltathree, The IP Communications Network, pp. 1-17.

Non-Final Office Action mailed Apr. 2, 2009 in U.S. Appl. No. 11/135,122.

Final Office Action mailed Jan. 28, 2010 in U.S. Appl. No. 11/135,122.

Non-Final Office Action mailed Mar. 4, 2010 in U.S. Appl. No. 12/235,252.

* cited by examiner

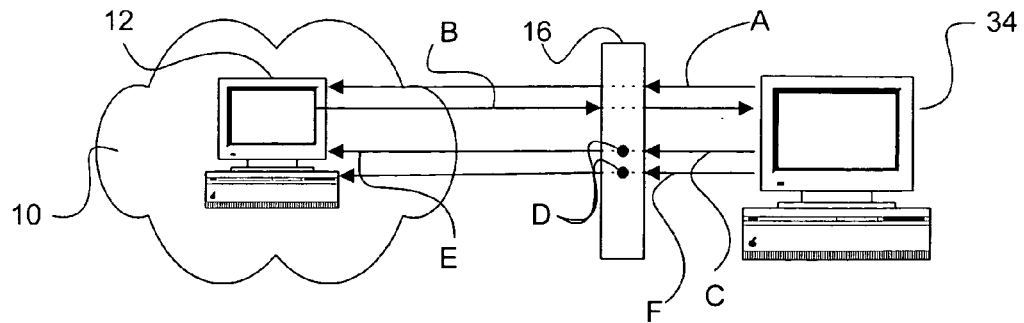

NAT MAPPING:
A - REQUEST PACKET FROM CLIENT; CLIENT ADDRESS=X
B - CONFIRMATION PACKET FROM SERVER WITH SESSION ID; SENT TO ADDRESS=X
C - MAPPER PACKET FROM CLIENT; CONTAINS CLIENT ADDRESS=X; EXTERNAL ADDRESS DATA=X
D - NAT INTERCEPT; REPLACE EXTERNAL ADDRESS DATA X WITH EXTERNAL ADDRESS=Y
E - SERVER RECEIVES MAPPER PACKET WITH INTERNAL ADDRESS=X AND EXTERNAL ADDRESS=Y; STORES MAPPING OF Y=X
F - OUTGOING VIDEOCONFERENCE DATA SENT FROM CLIENT TO SERVER

FIG. 4

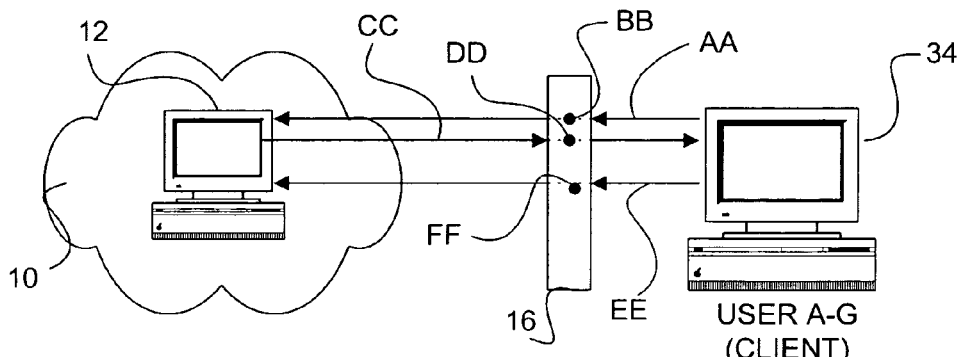

PROXY DECODING:
AA - REQUEST PACKET FROM CLIENT; INTERNAL ADDRESS=X; EXTERNAL ADDRESS = Z
BB - PROXY INTERCEPT; REPLACE INTERNAL ADDRESS=X WITH TRANSLATED ADDRESS=Y
CC - CONFIRMATION PACKET FROM SERVER WITH SESSION ID, SENT TO ADDRESS=Z, INCLUDES CONFERENCE ADDRESS CA
DD - PROXY INTERCEPT, REPLACE DESTINATION CLIENT ADDRESS=Y WITH CLIENT ADDRESS=X, TRANSLATES CONF. ADDR. CA TO P
EE - MAPPER PACKET FROM CLIENT ADDRESSED TO P; CONTAINS SESSION ID; EXTERNAL ADDRESS=X
FF - PROXY TRANSLATES ADDRESS P TO CA, DROPS MAPPER PACKET, NAT TRANSLATES EXTERNAL ADDRESS=X TO EXTERNAL ADDRESS =Q; FORWARDS TO CA

FIG. 5

METHODS AND PROGRAM PRODUCTS FOR MAPPING A NETWORK ADDRESS TRANSLATOR

PRIORITY CLAIM

The present invention claims priority on U.S. provisional application Ser. No. 60/581,472 filed on Jun. 21, 2004.

CROSS REFERENCE

The present invention is related to a U.S. Application filed on the same date as the present application entitled REAL TIME STREAMING DATA COMMUNICATIONS THROUGH A SECURITY DEVICE, by Swanson et al., commonly assigned to Insors Integrated Communications, Chicago Ill.; which application is incorporated herein by reference.

FIELD OF THE INVENTION

The present invention is related to systems, methods and program products for mapping a network security device. The present invention is also related to real time streaming data communication over data networks and through a security device. The present invention is also related to methods, systems, and program products for conducting videoconferences over a data network and through network security devices.

BACKGROUND

Real-time communications including audio and/or video conferencing can be difficult to implement on communications networks such as packet-based networks, including internet protocol ("IP") networks, without compromising existing security mechanisms. Currently proposed solutions require either substantial effort and/or security risks, or are dependant upon specific conferencing platforms.

It is common for computers and private networks to utilize security mechanisms to separate themselves from a public network. Examples of security devices are firewalls, network address translators ("NAT"), and proxies. NAT's are found on many networks that interface with other networks, including public networks such as the Internet. A NAT may operate in combination with another security device(s), and may, for example, be one component of a firewall. NAT's provide security from the outside public network by translating internal network addresses on outgoing data packets so that they appear as a different address when viewed from outside the NAT. In addition to providing security, NAT translations can also alleviate problems related to the relatively small address space of IP by effectively sharing a few public IP addresses among many hosts.

NAT's commonly perform Network Address Port Translation (NAPT, a.k.a. PAT). This is the translation of a packet's originating client address to a different address that is unique on the public network. This source address data is typically contained in a packet header or external data. With reference to FIG. 1 by way of example, a packet sent from User A may have an originating address including an IP/port pair that is summarized as address=X. The NAT 16 could intercept this packet and replace the external originating address=X with a NAT translated address=Y. The packet would then be communicated into the network 10 with the external originating address=Y data. As a result, any recipient of the packet on the network 10 will understand that it originated from address=Y. Typically, a NAT only translates fields in a data packet's external, as opposed to its internal, data. Accordingly, a UDP, TCP, or other protocol packet that included the client originating address in its payload would have its header address information translated by a NAT, but not the payload address data.

NAT translation can make it difficult (and in some cases, impossible) for a host on the public network such as a videoconference server to effectively communicate data such as two-way streaming audio and video data with a client. Because of NAT translation, the server receives data packets from the client with a NAT translated address attached. This can complicate communications for several reasons. For example, some communications sessions may be setup with the server through a request message that is not subject to NAT translation, with the result that the server may have conflicting address data for the client.

A NAT may be combined with another security device, such as a proxy or proxy server (the terms "proxy" and "proxy server" are used interchangeably herein). A proxy may specifically act on data packets only of particular protocols, and may act on both incoming and outgoing data packets. A proxy may operate to translate address data therein, among other actions. When present in combination with a NAT, a proxy can further complicate conducting communications such as a two-way streaming data event.

SUMMARY OF THE INVENTION

An exemplary method for mapping one or more network address translators that is between a client and a server on a packet based network comprises the steps of the client communicating a first message including a first client address to the server, the server extracting the first client address, and the server communicating a confirmation to the client including identifying data useful to identify the client to the server. Additional steps comprise the client communicating a dummy or mapper message to the server including the identifying data, the mapper message having external client address data when the server receives it, and the server extracting said identifying data and using it to identify the client. An additional step of comparing the external client address data to the first client address and using said comparison to map the one or more network address translators is provided.

BRIEF DESCRIPTION OF THE DRAWINGS

FIG. 4 is a schematic useful to illustrate exemplary steps of mapping a NAT;

FIG. 5 is a schematic useful to illustrate exemplary steps of mapping a proxy; and, FIG. 6 is a schematic useful to illustrate still additional exemplary steps of an embodiment of the invention in combination with the flowchart of FIG. 7.

DETAILED DESCRIPTION

Before discussing exemplary embodiments of the present invention in detail, it will be appreciated that the invention may be embodied in a method, a system, and/or in a computer program product. For example, a method of the invention may be carried out by one or more users using computers, and a program product of the invention may include computer executable instructions that when executed by one or more computers cause one or more computers to carry out a method of the invention. Further, one or more computer(s) that contains a program product of the invention may embody a system of the invention. It will therefore be understood that in describing a particular embodiment of the present invention, description of other embodiments may also be made. For example, it will be understood that when describing a method of the invention, a system and/or a program product of the invention may likewise be described.

Figure 1:
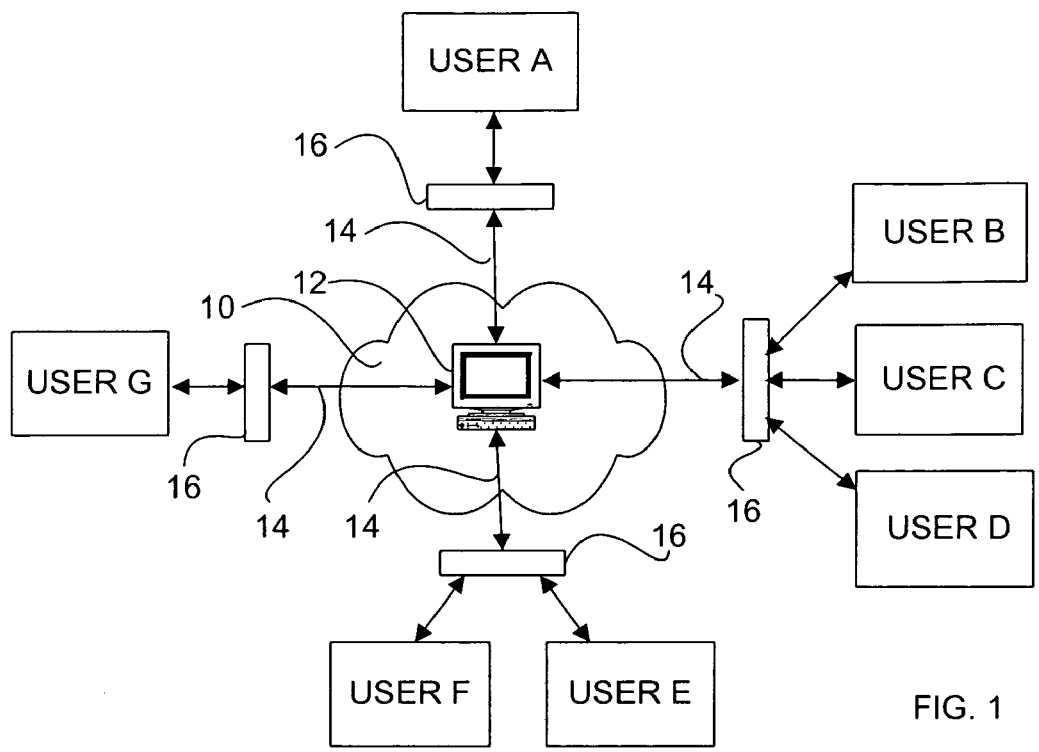
FIG. 1 is a schematic of a network useful for illustrating methods and program products of the invention in a videoconference environment.

Turning now to the drawings, FIG. 1 is a schematic of a network that is useful to describe an exemplary method of the invention. The network shown as a "cloud" 10 includes an interface 12 that links Users A-G to one another. The term "interface" as used herein is intended to be broadly interpreted as comprising one or more components for linking communications between users. It may include, for example, one or more computers having a plurality of communication ports, a software component running on one or more computers that facilitate communications, a networking card(s), a modem(s), and the like. The interface 12 may be referred to in the video/audio conferencing and networking arts as a "bridge" or "server" which generally comprises a computer or router having a plurality of ports for interconnecting the Users A-G. As used herein the term port is intended to be broadly interpreted as a physical or logical destination and/or origination point for digital communications. Examples of ports include but are not limited to, network cards, an IP address, a TCP or UDP port number, and the like.

The network 10 may be a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may the internet. Also, the protocol between bridge 12 and the Users A-G may be that of a server and clients.

The network 10 may be useful for a number of data communication purposes. In an exemplary application, the network 10 is useful to facilitate a virtual meeting between attendees that are physically present at each of the Users A-G. As used herein the term "virtual meeting" is intended to be broadly interpreted as a sharing of real-time communications between participants that are not physically present with one another. Examples of virtual meetings include an audio conference and/or a videoconference during which video and/or audio communications are shared in real-time between a plurality of users. As used herein the term "real-time" is intended to broadly refer to a condition of generally corresponding to actual time. For example, data is real-time if it takes about one minute of data playback to describe an event that took about one minute to occur. Real-time data may be, but is not necessarily, "live" data that is generated and communicated substantially contemporaneously. In a videoconference, for example, multiple participants may be sending and receiving live real-time video and audio data to one another—each is talking to one or more of the others in real-time.

Communications with each of the Users A-G may be carried out on a 2-way basis from the network 10, with data sent to and received from each of the Users A-G over the communications lines 14. These may comprise physically wired connections such as copper wires, optical fiber cables, or the like; or may be wireless connections. Real-time video, audio, and other data may be sent from each of the Users A-G to all others of the Users A-G through the bridge 12 and over the communications lines 14. A NAT 16 isolates each of the Users A-G from the network 10. Other security devices may likewise be present in combination with the NAT, with an example being a proxy. A firewall may likewise be present.

Those knowledgeable in the art will appreciate that communications over the network 10 between the Users A-G may be carried out in any of a number of generally known procedures. For example, known methods of one or more of uni-, multi-, or broad-cast may be used. Also, the data may be streaming. In a streaming video conference application, each user A-G may have one or more cameras, telephones and/or microphones from each of which is streamed a continuous, real-time data stream on a particular multicast address and port number. As used herein the term continuous data stream is intended to broadly refer to a data stream sent in substantially continuous succession, although some degree of intermittency is contemplated. For example, a packetized data stream in IP may be continuous and streaming even though there may be some delay between discrete packets.

One particular exemplary method for communicating and receiving the continuous data streams within the practice of the invention is according to the so-called "Real-time Transport Protocol" or "RTP." RTP is a widely supported Internet-standard protocol for the transport of real-time data, including audio and video. It can be used for media-on-demand as well as interactive services such as Internet telephony. RTP consists of a data and a control part. The latter is referred to as RTCP. The data part of RTP is a thin protocol providing support for applications with real-time properties such as continuous media (e.g., audio and video), including timing reconstruction, loss detection, security and content identification. RTP data is packetized in separate packets from RTCP control data, and RTP data is typically communicated across "data ports" while RTCP control data is communicated across "control ports."

Figure 2:
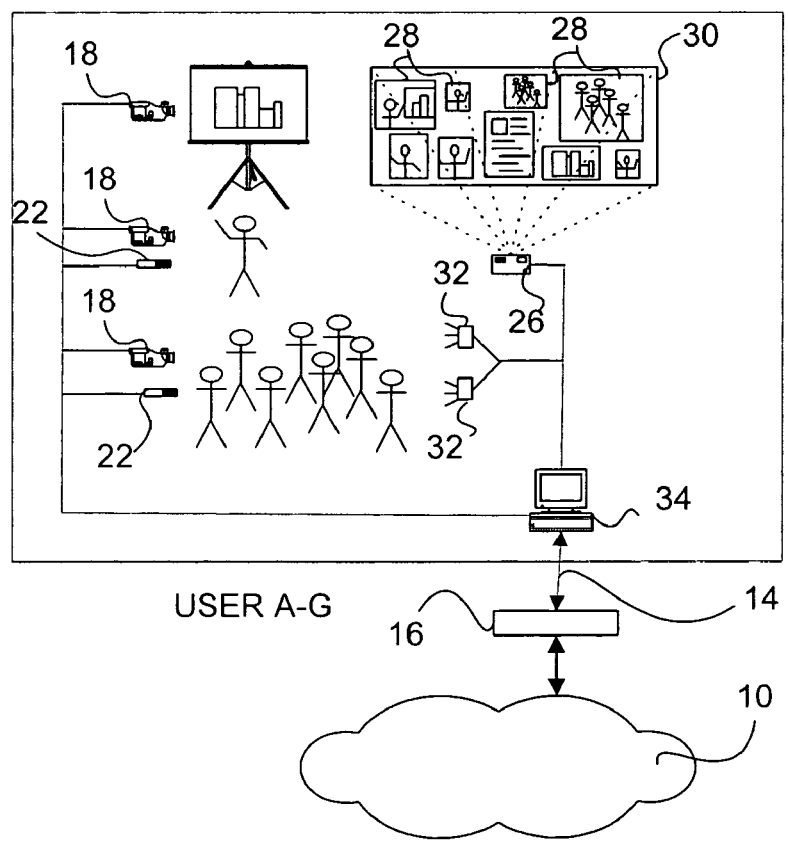
FIG. 2 is a schematic of a user of the network of FIG. 1.

Communications of the streaming real-time data between Users A-G may be further appreciated through consideration of the schematic of FIG. 2 that shows an exemplary of the Users A-G in detail. The Users A-G may be conference rooms that include multiple individuals that are all participating in the video conference in some manner. Users A-G include a plurality of cameras 18. The cameras 18 may be trained on different people or things at the Users A-G, with an example being one camera 18 at a presentation board, one camera 18 at a speaker, and one camera 18 at an audience. A first microphone 20 may be provided for receiving audio from the speaker and a second microphone 20 for receiving audio from the audience. Although not illustrated, other cameras, microphones, computers, gateways, firewalls, multi-plexers, coders/decoders ("codecs") and like devices may also be present. Also, it will be understood that FIG. 2 is exemplary only, and that a multitude of other configurations are possible for Users A-G, which may also include many other devices other than cameras 18 and microphones 20.

In an exemplary videoconference, each of the Users A-G not only sends streaming video and audio data, but likewise receives streaming video, audio, and other data communicated from some or all of the other Users A-G. Referring once again to the schematic of FIG. 2 by way of example, one or more projectors 26 may be provided to project real-time video images 28 from one or more of the other Users A-G on a screen 30. Any number of video images may be provided that show video data in real-time from any number of other cameras or other sources located at the other users. For example, the user A may simultaneously display video data streams from each of the other users B-G. Further, the video images displayed may include charts, graphs, documents, other digital files, replayed video files, and the like. One or more speakers 32 may also be provided to play real-time audio from the other users or other sources.

A particular example of a data file in addition to audio and video data includes shared documents having text, images, numerical values, and the like. For example, within a videoconference or virtual meeting different Users At different locations may desire to all work on a single document. In such circumstances, continuous updates of the document should be communicated between users.

One or more computers 34 may be provided at each of the Users A-G to receive and send all of the video, audio, documents, digital files and other data at the standard user A. The computer 34 may be referred to as a client computer or client. An application program, such as an RTP application, may be running on the computer 34 that provides signal coding/decoding, compression/decompression, coordinates receiving and sending of the data streams, and controls some other aspects of sending and receiving of the data streams. For example, the computer 34 may be used to control which or how many video images 28 are displayed on the screen 30, to size the images 28, to set audio levels for the speakers 32, and the like. It will be appreciated that many alternatives to the computer 34 are possible, including dedicated processor based devices and the like.

In exemplary videoconference and other virtual meetings, each discrete data stream that is communicated may have a unique identifier associated with it. By way of example, methods, program products, and systems of the invention may be practiced across packet switched networks 10 that are configured for carrying discretely packetized data communications, with internet protocol ("IP") communications being one example, and RTP communications being a more specific example. In IP communications, continuous data is packed into discrete packets and provided with a destination address. The address may be a digital string, for instance, that identifies a port on the bridge 12 (FIG. 1). Each of the discrete packets of data may also include a unique identifier, such as a digital origination address.

Figure 3:
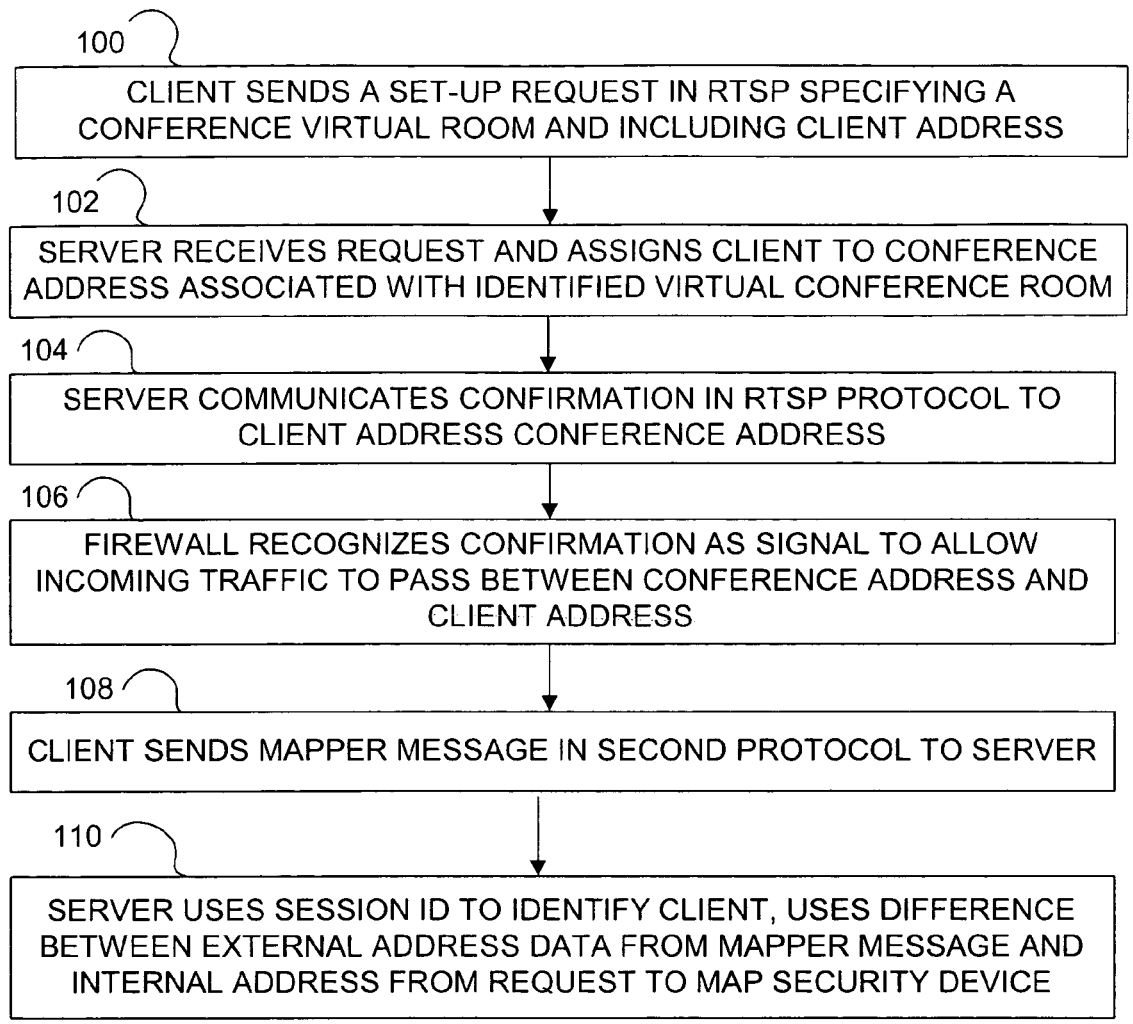
FIG. 3 is a flowchart illustrating one exemplary method of the invention.

The origination address may be, for instance, a digital string that identifies the computer 34, camera 18 or microphone 20 at the user A-G from which it originated (FIGS. 2-3). Within the RTP protocol, identifier information may be embedded into the header portion of individual packets by the RTP application programs running on the computers 34. For example, a particular data stream may have source identifying information such as an SSRC ("synchronization source" in RTP protocol) and/or another identifier that includes the user name, camera number, and IP address of the computer 34. The SSRC identifier carried in the RTP header and in various fields of RTCP packets is a random 32-bit number that is required to be globally unique within an RTP session.

According to the configurations of FIGS. 1-3, a real-time videoconference, or other virtual meeting can occur between the Users A-G. Users A-G may virtually "attend" a rich, immersive, and extensive virtual meeting that includes audio and/or video, and/or other streaming data shared in real-time. Participants at each of the Users A-G may simultaneously hear and/or view data from all others of the Users A-G. Such meetings may be desirable for corporations, universities, government, and other groups of people located remotely from one another that find it useful to interact in an environment that allows a greater level of intimacy than a phone call.

For convenience, the meetings may be organized in virtual "rooms" that correspond to ports on the bridge 12. Users A-G thus may select which of the others to meet with by selecting a virtual room (port) to meet in. If Users A, C and G, for instance, want to have a conference, they may communicate with one another beforehand and agree to meet at a particular time in the "Schlitz" room. By connecting to the bridge 12 at the prescribed time and specifying the "Schlitz" room, the Users A, C and G will be connected to the same port(s) at the bridge 12.

The NAT's 16 may complicate the video conferences and similar applications run over the network 10. Methods, systems, and program products of the invention provide beneficial solutions to many of these complications by mapping the translation that is occurring at the NAT 16. As used herein, the term "map" (or by extension "mapping") when used in this context is intended to be broadly interpreted as to decode or decipher. To map a translated address, for instance, is to determine the un-translated address.

Methods, systems, and program products for establishing two-way streaming communications across a firewall penetrating a firewall doing so are described in detail in the co-pending patent application titled "REAL TIME STREAMING DATA COMMUNICATIONS THROUGH A SECURITY DEVICE," a by Swanson and Chapweske, filed on an even date herewith, commonly assigned to Insors Integrated Communications, Inc., Chicago Ill.; and incorporated herein by reference.

The present invention is directed to mapping NAT's. FIG. 3 is a flowchart illustrating a first exemplary embodiment of a method of the invention for mapping a NAT. The method of FIG. 3 may be practiced, for example, on the network 10 of FIG. 1 and its NAT(s) 16. Element numbers from FIG. 1 will be used in discussing the flowchart of FIG. 3 for purposes of illustration. A client such as any of the Users A-G sends a first message to the server 12 that includes a client address. (block 100). The first message may be a request to setup a video conference or other streaming data event, and may include a conference identifier such as a virtual room name (e.g., the "Schlitz" room). The first message may be in a first protocol, with RTSP being one example. The server 12 receives the request, extracts the client address and the conference identifier or virtual room name. (block 102). The conference identifier is used to identify a server conference address over which streaming communications may be shared for the video conference. The conference address may be, for example, an IP/port(s) pair over which others of the Users A-G are sending real time streaming audio and video data.

The server 12 communicates a confirmation to the client that includes a conference address. (block 102). The confirmation may also include identifying data that is useful to identify the client to the server, with examples including a session ID, a codeword or the like. The confirmation is communicated in the same protocol as the request from the client, with RTSP being an example.

RTSP is one example of a protocol that is useful for setting up a videoconference or other two-way streaming real time data sharing event. RTSP is widely supported by commercial firewall vendors as a protocol for setting up the reception of streaming data. Accordingly, the firewall may recognize one or more of the RTSP setup request and confirmation as a signal to allow streaming traffic to pass between the server and client. (block 106).

The client then sends a dummy or mapper message to the server 12 that includes either the identifying data received in the confirmation, such as the session ID, or the client address in its internal (i.e., payload) data. (block 108). The terms "dummy message" and "mapper message" are used interchangeably herein, are used for convenience and are not intended to have any special meaning apart from what they are intended to refer to herein, and are intended to broadly refer to a data message including one or more data packets. The mapper message is preferably sent in a second protocol.

The mapper message will have it source address information included in its external data. This source address data is typically contained in a packet header or "external" data. As used herein, the term "external data" when used in this context is intended to broadly refer to header information that is provided with a data message or packet. When communicating data in discrete packets in IP protocol, for instance, each packet has an external data including a field for an IP originating or source address and a field for an IP destination address. If communicating a packet in UDP or RTP protocol, additional external data may include originating and destination port addresses. Herein, the term "address" may refer to a network address such as an IP address, a port, or an IP/port pair.

The NAT 16 may translate the external address of the mapper message. The translation device(s) may or may not have also translated the external source address information from the first message (request of block 100). The translation operations performed on the request and the mapper message may be different, however. The differences can arise due to several factors, including that the first message contained the client address in its internal data (i.e., payload data as opposed to external header data), and that the first message was in a first protocol that is different from the second protocol. It has been discovered that these differences can be leveraged to determine a mapping of the network translation device.

In particular, the exemplary method of FIG. 3 may exploit the difference between the external address data from the mapper message and the internal data from the first message or request to map the security device translation. Or, if the mapper message includes its un-translated client address in its internal data, the difference between this and the translated external source address can be used to map the translation device. In either case, the mapper packet serves as a useful tool to map the security device. (block 110).

Reference to FIG. 4 (in combination with the network schematic of FIG. 1) will be useful to further illustrate an exemplary method for mapping a NAT, including the method of FIG. 3. At A, the User or client sends a first message in a first protocol to the server 12 on network 10. The first message may be, for example, a setup request in RTSP protocol to setup videoconference participation. The request includes the client's address X. As the RTSP request traverses the NAT 16 its internal address is not translated because it is in RTSP protocol. Its external address data may or may not be translated. At B, the server receives the request, extracts the client address information of X, and sends a confirmation to the client. Any subsequent packet sent by the client in a second protocol different from the protocol of the request (with an example being UDP), however, will be intercepted by the NAT 16 and have its external address data translated. When the server 12 receives this subsequent data packet, it will not match up with the address information of X that the server has for the client, with the result that the server 12 may not associate the data as coming from the client.

The exemplary method of the invention includes the step of the client sending a mapper message at C to the server 12 with internal data including the client address X. When this mapper message passes the NAT 16, it is intercepted at D where the NAT translates the external address information from X to Y. The server receives the mapper message at E, and extracts the internal data of client address=X and the external data showing client address=Y. This information can be used to map the NAT translation of X=Y.

The mapper message may be configured in any number of ways for recognition as a mapper message, with examples including its internal data having some flag that causes the server to recognize it as a mapper message. Also, those knowledgeable in the art will appreciate that the mapper message might include information other than the client address X that will allow the server 12 to map the NAT translation of X=Y. Any data that identifies the client to the server 12 could be used. For example, when the server 12 initially receives the request, it may assign a unique session ID to the communications session with the client. This session ID may be communicated to the client in the confirmation. The client could include the session ID in the mapper message, which the server could then use to identify the client as the source of the mapper message. Likewise, some other unique identifier could be communicated to the client from the server in the confirmation that could be included in the mapper message, with examples including a unique codeword.

Once the server 12 has the mapping that relates X to Y, all further data that arrives from the client, with an example being the streaming videoconference data communicated at F, with external address information showing an address of Y will be recognized as originating from the client having the address X.

Exemplary NAT/Proxy Mapping Steps

A proxy may be present and operate in combination with another security device(s), including a NAT or other firewall. Proxies are most often found in combination with a NAT. The NAT 16 of FIG. 1, for instance, may include a proxy. A proxy generally sits at the application level above a NAT. A proxy may complicate videoconference communications. Some embodiments of the present invention include steps to map a NAT when a proxy is present in combination therewith.

Reference to FIG. 5 will be useful to illustrate one such exemplary invention embodiment. The client communicates a request at AA in a first protocol, with RTSP being an example. The request has internal data including a client address of X, which may be a designated address that the client has selected for sending and receiving a particular protocol data such as streaming RTP data. The first protocol proxy server, such as an RTSP proxy integrated with the NAT 16 recognizes the packet based on its protocol as one that it should intercept and proceeds to intercept the request at BB. The proxy translates the internal client address from X to a new proxy translated client address of Y. This proxy translated address Y can be thought of as a "forwarding" address from which the proxy will forward incoming communications received from the network to the address X. For practical purposes, the proxy intends the outside world (network 10) to "see" the client at the proxy translated address Y.

The server 12 receives the request including the internal proxy translated address of Y. The confirmation includes a conference address CA that may be an IP address and one or more ports. This is the location at which streaming data will be sent to and received from, which may for example a server IP address/port(s). The confirmation also includes data useful to identify the client with, such as a unique session ID, a codeword or the like. The confirmation may also include internal data showing the address of Y for convenience (e.g., it is convenient if the confirmation includes pertinent information summarizing the communications session in one packet: client source address, client proxy forwarding address and conference address).

The proxy server may block incoming traffic not addressed to the proxy forwarding address of Y. The proxy server recognizes the confirmation as one that should be intercepted based on its protocol, intercepts it at DD, extracts the internal address data of Y and recognizes this as the translation for X. The proxy also extracts the conference address CA provided by the server and replaces it with a proxy translated conference address of P. The confirmation is then forwarded to the client.

As a result of these communications and the proxy server's actions, the server 12 has recorded the client address for communicating streaming data to as the proxy translated address of Y. Subsequent data sent to this proxy translated address Y may be forwarded by the proxy to the specified client address of X. The client, however, received the confirmation indicating that the conference address was the proxy translated proxy address of P. The client therefore will communicate outgoing streaming data to the address P. When the proxy receives this at P, however, it may not forward it since the RTSP or similar protocol proxy is not configured to support outgoing data. Or, the proxy may forward the data to the server but the source address/port pair may be translated, potentially to something other than Y.

To map the proxy, this exemplary method of the invention includes a subsequent step of the client sending a mapper message in a second protocol at EE which contains data that identifies the client to the server 12. The identifying data may be, for example, the session ID or the codeword that was contained in the confirmation. The mapper message is sent from the client address X to the destination address P. It will include an external source address of X. Through the combination of the NAT and proxy, the mapper message may be forwarded to the conference address CA with its source address data translated, so that it arrives at the server with address data Q.

When the server 12 receives the mapper message, it will recognize the identifying data such as the session ID from the internal data, but the NAT translated address of Q will be unknown. The server 12 then consults a memory in which the session ID (and/or codeword or other information useful to identify the client with) and other information has been stored, including the address of Y that the server associates with the client and the session ID. The server retrieves the Y address from this memory. The Q address is added to this memory as an additional address corresponding to the client, and future incoming data having a Q address will be recognized as coming from the client.

Accordingly, the server 12 now has sufficient information to map the NAT 16 and each of the server 12 and client have sufficient information to carry on two-way streaming communications through the NAT 16 and proxy. The client will send streaming data from address X to the proxy forwarding address of P. Because this data is in a second protocol, it will be dropped by the proxy server and picked up by the NAT which will translate the address of X to Q. The server will receive it and recognize it as originating at the client. The server will communicate real-time streaming data to the address Y, which will then be forwarded to the client.

Exemplary Proxy/NAT Detection Steps

Often, a client and server communicate with one another with limited knowledge of whether a NAT or a NAT and proxy separate them. The present invention includes methods, systems and program products that provide for automated detection of whether a NAT or NAT/proxy exists, and for mapping the NAT in either of these circumstances. It has been discovered that these exemplary steps offer useful benefits and advantages in many applications where prior knowledge concerning a security device configuration exists (i.e., whether one or both of a NAT and a proxy need to be traversed).

Figure 6:
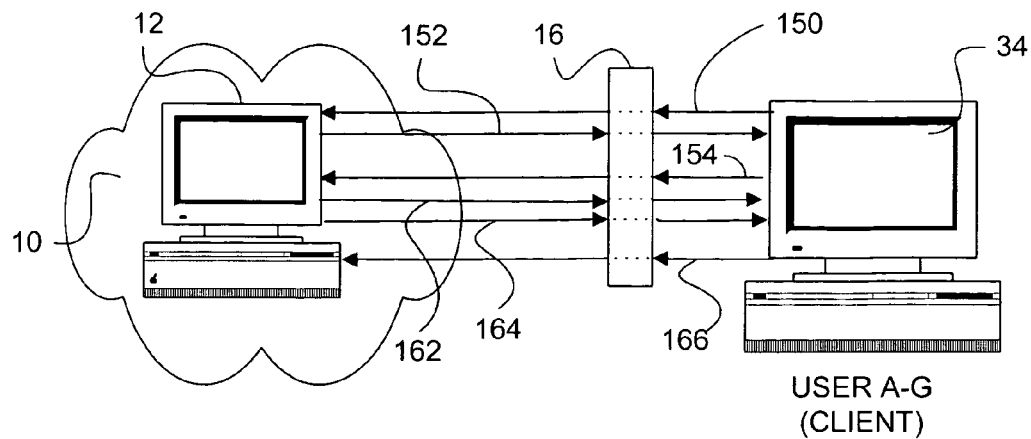
Figure 7A:
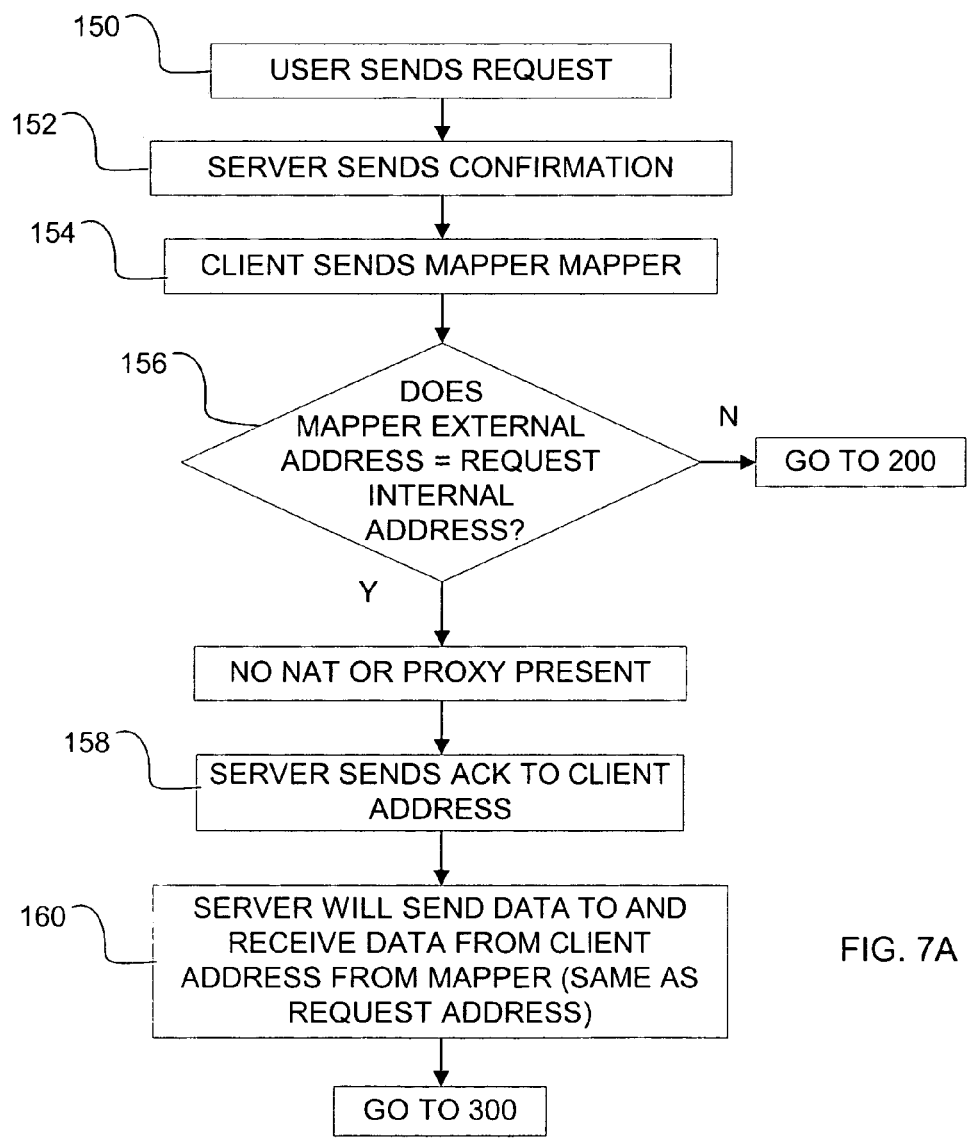
FIG. 7 is a flowchart showing exemplary steps of an embodiment of the invention.
Figure 7B:
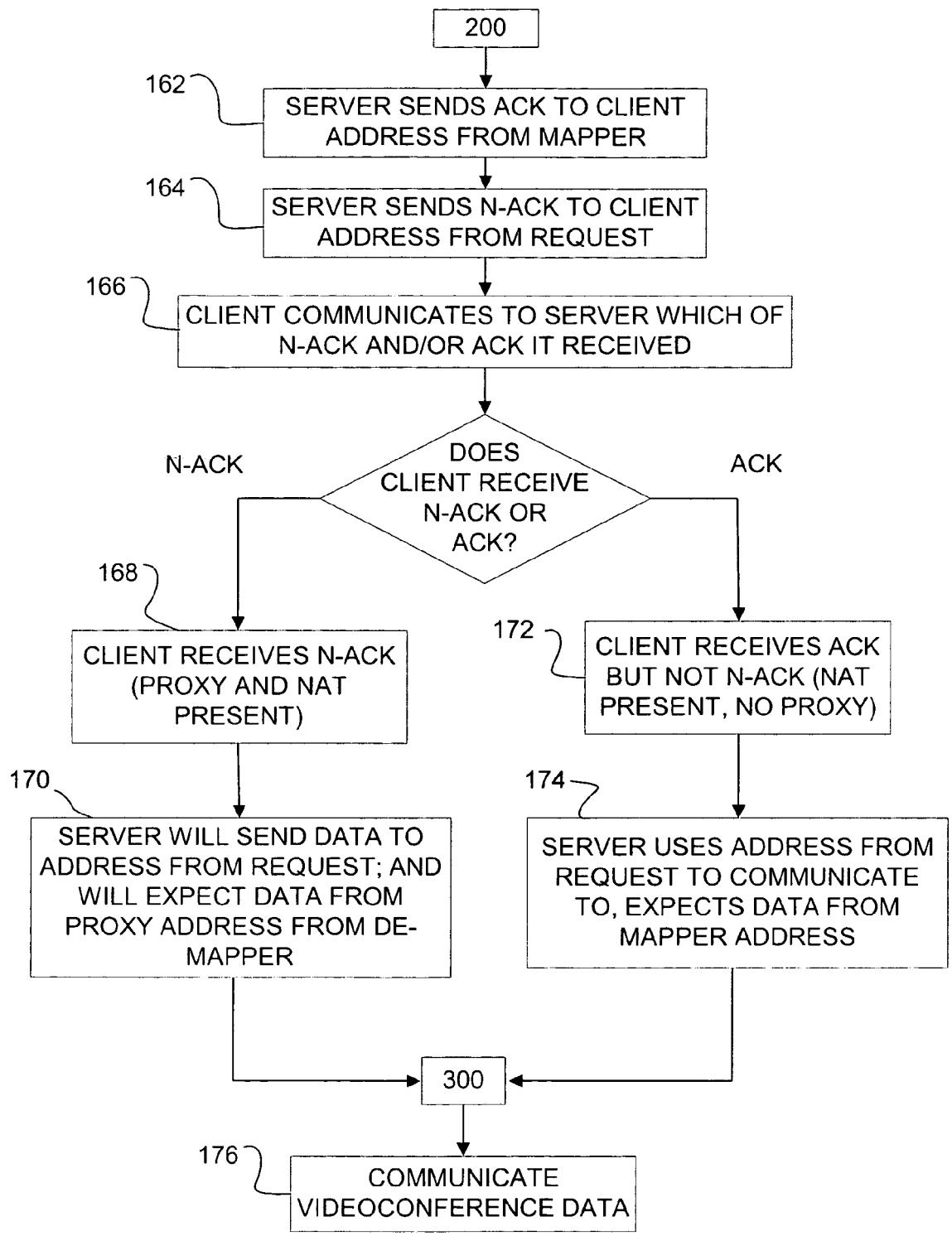

The schematic of FIG. 6 in combination with the flowchart of FIG. 7 (divided between FIGS. 7A and 7B) illustrates one exemplary set of steps for performing this discovery and mapping. Various of the block numbers of FIG. 7 have been used in the schematic of FIG. 6 to further illustrate the steps of the exemplary method. A client (such as any of the Users A-G of FIG. 1) sends a request in a first protocol that includes its address in its internal data. (block 150). The client address included therein may be the address specified by the client to receive streaming data at, which in the case of RTP data may be referred to as its RTP address.

The server 12 receives the request, extracts the internal address data, and communicates a confirmation in the first protocol to the client. (block 152). The confirmation includes identifying data useful to identify the client, such as a unique session ID or codeword, and includes the conference address. (block 152). After receiving the confirmation, the client sends a mapper message or packet in a second protocol that has the data useful to identify the client from the confirmation as internal data. (block 154). The mapper message is sent from the address specified in the previously sent request at which it is desired to receive streaming data at (e.g., the RTP address). This address will accordingly be included as external source address data with the mapper message.

The server receives the mapper or mapper packet, extracts the identifying data, uses the identifying data to identify the client, and compares the external address data from the mapper packet to the internal client address data from the request. (block 156). If the addresses are the same, then it is concluded that no NAT or proxy is present since no translation of addresses has occurred. If either of these had been present, the addresses would have been different (a NAT or proxy would have translated the mapper message external address data). The server then sends an acknowledgement or "ack" a to the client (block 158), and will communicate data to and will expect data from the client address that matches the external data from the mapper message and the internal data from the request. (block 160).

If the step of comparing the address data from the mapper message external data to the request internal data address (block 156) determines that they are different, this indicates that either a NAT or a NAT and a proxy are present. When the result of decision block 156 is negative, the method of FIG. 7 proceeds to steps of the server sending two acknowledgements in a second protocol, each to a different address. One acknowledgement is sent to the external client address from the mapper message (block 162), and a second acknowledgement is sent to the internal client address received in the request (i.e., the address data associated with the identifying data contained in the mapper message) (block 164). For convenience herein, the first acknowledgment may be referred to as an "ack" a and the second as a "negative" a acknowledgment or "n-ack." Because these two data packets are addressed differently, the client should only receive one (although both could be received in some circumstances). The client communicates which of these two is received to the server. (block 166). Which is received will indicate whether the client is separated by a NAT or a NAT and proxy combination.

The client can communicate to the server 12 which of the ack or n-ack has been received in any of a number of several possible exemplary steps. It may simply send one or more data packets, referred to herein as a de-mapper, confirming which have been received, for instance. Or it may only send a de-mapper only if a specified one of the two has been received and not send a de-mapper if the other has been received (e.g., send de-mapper only if n-ack received, but don't send anything if n-ack is not received, in which case the server will assume that a de-mapper confirms the n-ack was received and the lack of a n-ack as confirming that an ack was received).

Further, it is contemplated that the client need not communicate which of the two acknowledgments has been received. Instead, this information could be used by some other computer on the network 10, or by the client itself, to determine the NAT/proxy configuration.

If the client receives the n-ack (sent to the internal address from the request) (block 168), this suggests that both a NAT and a proxy are present. When the request was sent, the proxy intercepted it and translated the internal client address therein to a translated proxy address. This translated proxy address will be used as a "forwarding" address by the proxy; incoming data from the network will be received here and forwarded to the client.

If the client receives the ack but not the n-ack (block 172), this indicates that there is a NAT present but no proxy. The NAT 16 intercepted the mapper message or packet, translated the external address with a NAT translated address, and set this address up as a forwarding address. The n-ack should not be received since its destination address is not routable.

After it has been determined that no NAT/proxy is present, a NAT is present, or a NAT and a proxy are present, the method of FIG. 7 proceeds to conduct two-way communication of real-time streaming data, with an example being videoconference data. (block 176).

Accordingly, the present invention provides numerous benefits and advantages over the prior art. For example, mappings of network security devices such as a NAT and/or a proxy may be achieved without requiring modification or replacement of existing components. Embodiments of the invention thereby enhance a system without impairing any existing functions. This is one example of a valuable benefit of the present invention.

Those skilled in the art will appreciate that the exemplary embodiments described and discussed herein have been selected as being exemplary only, and that the invention is not limited to these examples. For example, although exemplary invention embodiments have been illustrated in association with real time streaming data applications such as video conferences, other applications will find benefits and advantages for practice of the invention. Many additional streaming data applications, including voice over internet phone applications, for example, may readily adapt embodiments of the invention. Further, some embodiments of the invention have included steps that utilize the RTSP protocol. This is for illustration only, and it will be appreciated that other similar protocols may also be used within the scope of the invention. Suitable similar protocols include those that are widely supported by security device providers for establishing a path through a security device for particular traffic.

Also, it will be appreciated that although exemplary method and program products have been illustrated in a particular sequence of steps, the sequence is not necessary to the invention and could easily be altered. Computer program embodiments of the invention are also not limited to a single computer, but may be practiced by a plurality of computers. As an example, a server computer 12 and a User A-G computer of the network of FIG. 1 may each be running program code that includes aspects of the present invention, and each separate computer may carry out some steps of a method of the invention.

The invention claimed is:

1. A method for mapping a network address translator (NAT) that is between a client and a server on a packet based network comprising the steps of:

the client communicating a first message in a first protocol including a first client address to the server, the NAT recognizing said first message first protocol and performing an address translation or not performing an address translation on said request depending on what said first protocol is;

the server extracting said first client address;

the server communicating a confirmation to the client;

the client communicating a mapper message to the server in a second protocol having external client address data when the server receives it and having identifying data useful to identify the client to the server, said mapper message external client address data different from said first client address, the NAT recognizing said second message second protocol and treating said second message differently than it treated said first message because of the difference between said first and second protocols;

the server extracting said identifying data and using it to identify the client;

comparing said external client address data to said first client address and using said comparison to map the NAT;

the server sending a first acknowledgment to said first client address and a second acknowledgement to said mapper message external address, each of said first and second acknowledgments in said second protocol;

the client receiving one of said first or second acknowledgements; and, determining which of said first and second acknowledgments the client received.

2. A method as defined by claim 1 wherein said confirmation includes said identifying data useful to identify the client to the server within an internal payload portion of said confirmation.

3. A method as defined by claim 1 wherein said identifying data comprises one or more of said first client address, a session ID and a codeword.

4. A method as defined by claim 1 and further including the steps of the server establishing a session ID after receiving said first message, the server communicating said session ID in said confirmation to the client, and wherein said identifying data includes said session ID.

5. A method as defined by claim 1 wherein said first protocol is RTSP protocol and said second protocol is UDP.

6. A method as defined by claim 1 wherein said first client address comprises an address for receiving streaming data, and wherein said mapper message is communicated from said first address.

7. A method as defined by claim 1 wherein said first message comprises a request to setup a streaming data session between the client and the server, and wherein said confirmation includes a server address for communicating streaming data to and a session identifier, and wherein said identifying data is said session ID.

8. A method as defined by claim 1 wherein said first message further includes a conference identifier, and further including the step of using said conference identifier to identify said server address.

9. A method as defined by claim 1 and further including the step of the server communicating real-time streaming data to the client, and the client communicating real-time streaming data to the server.

10. A method as defined by claim 1 wherein said first client address data is internal to said first message.

11. A method as defined by claim 1 and further including the steps of:
the NAT intercepting said mapper message before it reaches the server and translating said external address data to a translated client address; and,
the server using said identifying data and said translated client address to identify the client as the source for subsequent incoming data from said translated client address.

12. A method as defined by claim 1 and further including the steps of determining that a NAT but no proxy is present if the client received said second acknowledgement but not said first, or determining that a NAT and a proxy are present if said client received said first acknowledgment but not said second acknowledgment.

13. A method as defined by claim 12 and further including the step of the client communicating to the server which of said first or second acknowledgments were received, and wherein the steps of determining whether a NAT or a NAT and a proxy are present are carried out by the server.

14. A method as defined by claim 1 wherein said first protocol is RTSP and said first message comprises an RTSP setup request, and wherein said confirmation is in RTSP protocol.

15. A method as defined by claim 1 wherein the method is being practiced to establish two-way streaming communications for a videoconference between a plurality of clients, and further including the step of the server communicating real-time streaming audio and video data to the client across the NAT and the client communicating real-time streaming audio and video data to the server across the NAT.

16. A method for mapping a network address translator NAT that is located between a client and a server on a packet based network and for communicating streaming two-way videoconference data across the NAT, the method comprising the steps of:
the client communicating a request to the server in a first protocol, said request including a first client address and a conference identifier, the NAT recognizing said first protocol and performing an address translation or not performing an address translation on said request depending on what said first protocol is;
the server extracting said first client address from said request, using said conference identifier to identify a server address for communicating streaming data, and establishing identifying data for identifying the client;
the server communicating a confirmation to the client including said identifying data and said server address;
the client communicating a mapper message in a second protocol to the server including said identifying data placed in internal payload data, the NAT treating said mapper message differently than it treated said first message because of the difference between said first and second protocols;
the server receiving said mapper message, said mapper message having external client address data when it is received that is different than said first client address, the server extracting said identifying data from said mapper message internal payload data and using it to identify the client;
the server communicating a first acknowledgment to said first client address and communicating a second acknowledgment to said mapper message external client address data, each of said first and second acknowledgments in said second protocol;
the client receiving one of said first or second acknowledgments and communicating to the server which of said first or second acknowledgments were received; and,
the server mapping the NAT based on knowledge of which of said first or second acknowledgments were received by the client and using said mapping to communicate two-way streaming videoconference data with the client.

17. A method for mapping a network address translator on a packet based network between a client and a server comprising steps of:
the client to communicate a request to establish a streaming data session including a first client address and a conference identifier to the server;
the server to extract said first client address and said conference identifier from said first message;
the server to use said conference identifier to identify a server address for communicating streaming data with and the server and to establish identifying data for identifying the client;
the server to communicate a confirmation to the client including said server address and said identifying data;
the client to communicate a mapper message to the server including said identifying data, said mapper message having external address data when it arrives at the server, said mapper message communicated in a second protocol that is different than the protocol of said request to cause one or more security devices between the client and server to treat the mapper message differently than said request;
the server to extract said identifying data and using it to identify the client;
the server to compare said external client address data to said first client address to map the one or more security device;
the server to communicate a first acknowledgement to said first client address;
the server to communicate a second acknowledgement to said client address from said mapper message; and,
determining which of said first and second acknowledgments were received by the client, and determining which one or more security devices are present based on which of said first and second acknowledgments were received.

18. A method for mapping a network address translator that is between a client and a server on a packet based network comprising the steps of:
the client communicating a first message in a first protocol including a first client address to the server;
a proxy intercepting said first message and replacing said client address with a proxy translated client address and then communicating said first message to the server;
a NAT recognizing said first message first protocol and not performing an address translation on said first message;
the server extracting said translated proxy client address;
the server communicating a confirmation including a conference address to said translated proxy client address;
the proxy intercepting said confirmation, replacing said conference address with a proxy translated conference address and forwarding said confirmation to said client;
the client communicating a mapper message for said first client address to said proxy translated conference address to the server in a second protocol having external client address data when the server receives it and having identifying data useful to identify the client to the server within its internal payload data;

the proxy replacing said proxy translated conference address with server address in said mapper address;

a NAT recognizing said mapper message second protocol as different from said first protocol and treating said mapper message differently as a result, the NAT translating said external client address data from said mapper message to a NAT translated address that is different from said first client address data;

the server extracting said identifying data from said mapper message internal payload data and using it to identify the client;

comparing said external client address data to said first client address and using said comparison to map one or more of the NAT and proxy;

the server sending a first acknowledgement to said first client address and a second acknowledgement to said NAT translated address; and, determining which of said first and second acknowledgments is received by the client.

* * * * *